3,320,034
CONVERSION OF $U_3O_8$ TO UC
Sydney Strausberg, Woodland Hills, Calif., assignor, by mesne assignments, to the United States of America as represented by the United States Atomic Energy Commission
No Drawing. Filed Nov. 5, 1964, Ser. No. 409,305
7 Claims. (Cl. 23—349)

This invention relates to the preparation of uranium monocarbide (UC). It particularly relates to the preparation of uranium monocarbide of controlled carbon content by the carbothermic reduction of triuranium octaoxide ($U_3O_8$). It further relates to the CARBOX process for the recovery and reprocessing of spent UC fuel.

Uranium monocarbide shows considerable promise as a fuel material for high temperature nuclear reactors, such as liquid sodium-cooled reactors. By the term UC or uranium monocarbide, as used herein, is included the hypo- and hyperstoichiometric compounds in addition to the stoichiometric compound, unless indicated otherwise by the context. The term $UC_{1.00}$ would refer to only the theoretical stoichiometric uranium monocarbide. Uranium monocarbide possesses the high burnup characteristics and radiation stability of ceramic fuels such as uranium dioxide ($UO_2$), and also has heat transfer characteristics considerably superior to the ceramic fuels, approaching those of uranium metal. The theoretical stoichiometric concentration of carbon in uranium monocarbide is 4.80 weight percent. It is desirable that the actual carbon content be closely controlled lest difficulties occur in the use of UC as a nuclear fuel element. Thus, where hyperstoichiometric UC is present when stoichiometric UC is required, the excess free carbon present in the UC matrix causes carburization of the ferrous metal claddings in which the fuel is customarily contained. Where excessively hypostoichiometric UC is used, other problems may occur, such as poor radiation stability of excess uranium present, phase inversions, and lower uranium carbide melting point. Thus, the ability to prepare stoichiometric UC, or UC of known and controlled hyper- or hypostoichiometric carbon content, is essential for the successful use of this nuclear fuel.

The control of carbon content in UC to close tolerances by use of present arc-melting and casting methods, where UC is prepared by a direct reaction of uranium or uranium dioxide with carbon, is extremely difficult and only partially satisfactory. Furthermore, for the recovery and reprocessing of spent UC fuel, it has been proposed to oxidize UC to $UO_2$, followed by conversion of the uranium dioxide to UC by carbothermic reduction. This presents several problems. First, $UO_2$ powders are generally quite active, sometimes even pyrophoric, so that variable O/U ratios generally result during exposure to typical atmospheres. Since the O/U ratios is not easily determined with accuracy, the correct amount of carbon to be added for UC preparation is difficult to determine. It has also been proposed, in order to prepare $UO_2$ of controlled oxygen content for carbothermic reduction to UC, that spent UC fuel be converted to the more stable $U_3O_8$ and then reduced to $UO_2$ by heating the $U_3O_8$ at a temperature of 700° C. to 1000° C. in a hydrogen atmosphere furnace. The $UO_2$ would then be carbothermically reduced. Such a process would not be as desirable as a direct carbothermic reduction of $U_3O_8$ because of the introduction of the additional step of hydrogen reduction with the required associated equipment.

Triuranium octaoxide is a chemically stable material readily obtained with a fixed O/U ratio (2.67) so that the correct amount of carbon addition for reduction to UC can be determined readily. Furthermore, while it is difficult to oxidize UC to a composition exactly corresponding to $UO_2$, the oxidation of UC to $U_3O_8$ proceeds with considerable ease. Thus, it has been proposed in the CARBOX process for the reprocessing of spent UC fuel elements that these fuel elements be oxidatively decladded, intermediately formed highly reactive $UO_2$ being quickly oxidized to $U_3O_8$ upon exposure to air, and that the $U_3O_8$ be reacted with carbon so as to carbothermically reduce it to UC.

Unfortunately, attempts to prepare UC of controlled carbon content from $U_3O_8$ have heretofore been unsuccessful in that the apparent stoichiometry of the equation as set forth by the reaction $$U_3O_8 + 11C \rightarrow 3UC + 8CO\uparrow$$

is not obtained in practice. In fact, the product from mixtures of $U_3O_8$ and 11C is hyperstoichiometric, i.e., UC containing variable and unpredictable amounts of $UC_2$. Thus, the reduction is extremely difficult to control, runs made under identical conditions varying by as much as 1.5 weight percent carbon (almost 33% variation). Thus the need exists for a simple, controllable process for the carbothermic reduction of $U_3O_8$ to provide UC of controlled carbon content.

Accordingly, it is an object of the present invention to provide a process for the production of UC of controlled carbon content.

It is a further object to provide a process for the conversion of $U_3O_8$ to UC of controlled and predictable carbon content by carbothermic reduction.

It is still a further object to provide a process suitable for the commercial reclaiming of spent UC fuel elements.

In accordance with this invention, $U_3O_8$ is carbothermically reduced to UC by utilizing a temperature-controlled two-stage process represented essentially as follows:

$$U_3O_8 + 10C \xrightarrow{<1050°\,C.} 3UO_2 + CO_2\uparrow + 9C$$

$$3UO_2 + 9C \xrightarrow{>1100°\,C.} 3UC + 6CO\uparrow$$

The success of the process depends on the essentially complete reduction of $U_3O_8$ to $UO_2$, with evolution of $CO_2$, prior to any reduction occurring of $UO_2$ to UC, with evolution of CO. Ordinarily, when a $U_3O_8$-carbon mixture is directly heated to a temperature at which $UO_2$ and carbon react, the evolved gas is a mixture of unpredictable amounts of CO, $CO_2$ and perhaps even oxygen, as $U_3O_8$ loses oxygen at elevated temperatures. In the present process, the $U_3O_8$ reduction step is monitored to insure complete conversion to $UO_2$ plus $CO_2$, and some traces of CO, prior to raising the temperature to initiate the $UO_2$ reduction and evolution of CO. Monitoring is conveniently accomplished by use of a recording balance, although a vacuum gage or gas meter or similar apparatus can equally well be utilized. When evolution of $CO_2$ has substantially ceased, the first stage reaction will have been completed.

The first reaction may conveniently take place at a temperature not exceeding 1050° C. and preferably is conducted at a temperature between 800° C. and 900° C. The second reaction is accomplished at a temperature in excess of 1100° C. and preferably at a temperature between 1250° C. and 2000° C. As is well recognized kinetically, lower temperatures will require longer reaction times for completion of the reactions. Conveniently and preferably the two reactions may be accomplished at starting temperatures of 800° C. and 1250° C. respectively, gas evolution occurring at rapid and controllable rates at these temperatures. For completion of the reactions the temperatures will generally be increased. The first reaction will generally be completed within 30 minutes to 2 hours. The second reaction, in which considerably greater quantities of gas must be evolved, will generally require 3 to 5 hours. It is further noted that the stoichiometry involved herein calls for the use of approximately 10 moles of carbon per mole of $U_3O_8$ rather than for the 11 moles ordinarily expected heretofore. Where hyper- or hypostoichiometric UC is desired, the carbon to oxide molar ratio will be correspondingly increased or decreased from the 10:1 molar ratio used for preparing stoichiometric UC.

There are many advantages associated with the present process. Heretofore, because of the difficulty encountered in controllably, carbothermically reducing $U_3O_8$, it was preferred to reduce $UO_2$. However, oxidation of UC with air or oxygen ordinarily proceeds to $U_3O_8$. With the present process, any subsequent hydrogen reduction of $U_3O_8$ to $UO_2$ is now eliminated. In addition, starting with a material of known composition is extremely important and useful. Thus uranium dioxide obtained by oxidation of UC would ordinarily be of variable stoichiometry. Where a uranium dioxide preparation actually corresponded to $UO_{2.06}$, it would poduce UC about 0.12 weight percent low in carbon. This extra oxygen in uranium dioxide would be difficult to determine precisely, so that the amount of carbon required to obtain UC of known carbon content would not be known precisely. It is further noted that even though a two-step reaction is involved in the present process, the over-all reaction time is actually decreased because of the rapid reaction rate that occurs for the high temperature step. Thus the process of this invention is emiently suitable for commerical use for the preparation of uranium monocarbide of controlled carbon content.

In order to obtain optimum results with respect to ease of reaction and uniformity of carbon content, it is important that the $U_3O_8$ and the carbon be homogeneously blended. The $U_3O_8$ in the form of a fine powder is screened to utilize at least a —200 mesh fraction, U.S. standard sieve size. Thus, particle sizes down to a micron range may be utilized. Where $U_3O_8$ is obtained from the oxidation of UC, slight amounts of carbon may be present in combined form as carbonate, and this may be corrected for where highly precise results are required. In general, $U_3O_8$ powders have enhanced blending characteristics compared with $UO_2$ powders, which tend to agglomerate to a greater extent.

The carbon utilized for the carbothermic reduction is preferably in the form of a fine graphite powder because of the greater availability, higher density, and anticipated higher purity of graphite. Depending on its purity and prior history, the graphite powder may be first outgassed by heating in a vacuum to obtain highly precise results. Ordinarily the graphite is ball milled to reduce its particle size for improved blending and reaction with the $U_3O_8$. Preferably a —200 mesh fraction is used.

Where relatively large batches of powders are reacted, the rapid evolution of the reaction gases, as well as their considerable volume, may occasionally eject portions of the charge. To avoid this, it may be convenient to consolidate the powders by agglomeration to a pasty consistency, preferably using an organic binder such as a high polymer, and then drying the agglomerates. Compacting may be also used, but this is usually a more time-consuming technique. Polyvinyl alcohol (PVA) is preferred as a useful binder in the preparation of the agglomerates. The term "agglomerates" as used herein broadly includes tumbled and rolled forms and aggregates as well as pellets, compacts, and other shapes whether or not binder, pressure, and heat are used in their preparation. The agglomerates should be dried prior to reaction if formed by inclusion of liquids. Generally, one percent by weight of polyvinyl alcohol is added for purposes of agglomeration, the PVA being first dissolved in an aqueous solution, although it may also be blended as a powder directly with the $U_3O_8$ and graphite. Because the PVA binder will contribute a certain quantity of carbon to the final result, this carbon contribution must first be determined and allowed for in the final reaction. Where graphite crucibles are used in carrying out the reaction, there is generally a certain determinable contribution of carbon made by the crucible, and this may also be allowed for in determining the stoichiometry of the final product. Thus, an over-all correction factor which would include the carbon contribution from a PVA binder as well as the carbon pickup from the crucible is applicable. Generally, it is preferred to carry out both stages of the reaction under vacuum, although a reducing or inert atmosphere may also be used, with continuous removal of the reaction gases generated. In the design of the furnace, allowance is made for the considerable gas evolution that occurs at both stages of the reaction.

The following examples are illustrative of the invention but are not to be construed as limitations thereof.

EXAMPLE 1

*Carbothermic reduction of $U_3O_8$ to UC with and without polyvinyl alcohol binder*

$U_3O_8$ was prepared by the oxidation of UC by an initial ignition in air at a temperature between 300° C. and 400° C. and then stabilized by further ignition at 550° C. The resultant $U_3O_8$ was obtained as a fine powder and then screened to obtain a —400 mesh fraction. Samples were prepared by intimately mixing the $U_3O_8$ powder with purified —400 mesh graphite powder, and then with and without the addition of approximately 1% by weight polyvinyl alcohol as binder. The effect of heating rate was also evaluated. In the four experimental runs shown below, two runs were made without binder at essentially constant heating rates, and the two runs with binder were made at variable heating rates. Six gram-size samples were evaluated, a thermobalance being used to determine when each of the reactions was complete. For the first stage, the heating times to reach the temperatures of 825° C. and 900° C. were as shown. For the second stage the samples were heated in the 1300° C. to 1700° C. range and then completed at 1750° C. for 1 hour, where constant weight was indicated. The results obtained are shown in Table I.

TABLE I.—CARBOTHERMIC REDUCTION OF $U_3O_8$ TO UC—EVALUATION OF PVA

| | | | | |
|---|---|---|---|---|
| Wt. PVA/wt. $U_3O_8$, Percent | 0 | 0 | 1.15 | 1.15 |
| Charge, Atoms C/mole $U_3O_8$: | | | | |
| From PVA | 0 | 0 | 0.27 | 0.27 |
| Added as graphite | 10.37 | 10.37 | 10.10 | 10.10 |
| Total | 10.37 | 10.37 | 10.37 | 10.37 |
| Heating Time: | | | | |
| To 825° C., min | 40 | 45 | 70 | 8 |
| To 900° C., min | 105 | 105 | 115 | 30 |
| Carbon Content of UC, Percent: | | | | |
| Theoretical | 5.34 | 5.34 | 5.34 | 5.34 |
| Analyzed, Sintered | 5.33±0.05 | 5.31±0.12 | 5.35±0.03 | 5.31±0.03 |

It is noted from the foregoing results that excellent control in the preparation of UC from $U_3O_8$ was obtained, the amount of carbon contributed by the binder not being greatly affected by the heating rate. It is noted that although the binder contributes a significant amount of carbon to the product made from $U_3O_8$, its behavior is sufficiently predictable to permit adequate control of carbon composition in the sintered UC.

EXAMPLE 2

Preparation of hypostoichiometrc $UC_{1-x}$

Four gram-scale experiments were carried out using a thermobalance to evaluate the results obtained, the second-stage temperature being varied. The $U_3O_8$ and graphite powders were of −400 mesh size. The results obtained are shown in Table II TABLE II.—PREPARATION OF HYPOSTOICHIOMETRIC $UC_{1-x}$ FROM (UC-DERIVED) $U_3O_8$

| $U_3O_8$ Used—Batch | A | A | A-1 [1] |
|---|---|---|---|
| Percent C | 0.21 | 0.21 | [2] 0.02 |
| Percent $CO_3$ | [2] 1.05 | [2] 1.05 | [2] 0.10 |
| Weight, gms | 6 | 6 | 6 |
| Charge, Atoms C/mole $U_3O_8$ | 9.83 | 9.83 | 10.00 |
| Finishing Temperature, °C | 1,850 | 1,660 | 1,750 |
| Carbon Content of UC, Percent: | | | |
| Theoretical | 4.51 | 4.51 | 4.77 |
| Sintered | 4.51±.04 | 4.47±.01 | 4.68±.03 |
| Arc-Melted | 4.38 | 4.24 | 4.53 |

[1] Same as batch A (prepared at 550° C.) but refired at 850° C.
[2] Estimated—remaining compositions obtained by analysis.

It is noted that reasonable control of carbon content was obtained even though there was a certain amount of carbon picked up from the crucible used.

EXAMPLE 3

Composition control of UC prepared from $U_3O_8$

Samples of $U_3O_8$ powder were reduced to $UO_2$ in the first-stage reaction by heating with graphite powder at a temperature varying between 835° C. and 930° C., using approximately 10 moles of carbon for each mole of $U_3O_8$ present, but varying the amount of graphite added to produce on a calculated basis, hypo– and hyperstoichiometric UC as well as the stoichiometric compound After stablization occurred, the weight loss data indicating that the gas product from the low temperature step was $CO_2$ heating was continued at temperatures varying from 1320° C. to 1560° C. The product from the carbothermic reduction step was obtained as a porous partially sintered mass. These samples were then arc melted shortly after removal from the vacuum furnace to prevent reaction with moisture and oxygen in the atmosphere. The arc-melted samples were then analyzed for carbon content. Typical results are shown in Table III

TABLE III.—COMPOSITION CONTROL OF UC PREPARED FROM $U_3O_8$

| Charge Wt., gms | Carbon Content | |
|---|---|---|
| | Calculated | Analyzed |
| 15 | 4.60 | 4.54 |
| 100 | 4.60 | 4.66 |
| 15 | 4.80 | 4.76 |
| 1,500 | 4.72 | 4.91 |
| 150 | 5.20 | 5.20 |
| 1,500 | 4.54 | 4.73 |

These results show a decided improvement over usual attempts to prepare UC of controlled composition.

It will of course be understood that many variations may be made in the practice of the process of this invention without departing from the spirit thereof. Thus uranium dioxide of unknown oxygen content may first be oxidized to $U_3O_8$ and then carbothermically reduced to UC by the two-step process of this invention. Or, if $U_3O_8$ is the starting material, then the carbothermic reduction may proceed directly from $U_3O_8$ to UC by the two-stage process. Thus, the present process affords a convenient method for preparing UC whether starting from $U_3O_8$ or from $UO_2$ of variable oxygen content. At the same time the process of this invention is of particular utility in conjunction with the CARBOX process: stainless steel clad sodium-bonded UC fuel rod samples are declad by mechanically puncturing the cladding and then removing the sodium therein by vaporization at approximately 560° C. under vacuum. The exposed fuel may then by oxidized by superheated steam at temperatures up to about 750° C. to form $UO_2$ which is then readily oxidized to $U_3O_8$ in air. Accordingly, the scope of the present invention should be considered as limited only by the objects and claims thereof.

I claim:

1. The process for preparing uranium monocarbide of controlled carbon content from triuranium octaoxide which comprises reacting triuranium octaoxide with carbon in a molar ratio of approximately 1:10 in a two-stage carbothermic reduction process, the first stage reaction including evolution of a gas consisting principally of carbon dioxide, the temperature being maintained below 1050° C. and the second stage reaction including evolution of a gas consisting principally of carbon monoxide, the temperature being maintained above 1100° C.

2. The process for preparing UC of controlled carbon content from $U_3O_8$ by carbothermic reduction which comprises intimately mixing $U_3O_8$ with carbon in a molar ratio of approximately 1:10, heating the reaction mixture at a first temperature between 800° C. and 900° C. until gas evolution consisting principally of carbon dioxide substantially ceases, and then maintaining the reaction mixture at a second temperature between 1250° C. and 2000° C. until further gas evolution consisting principally of carbon monoxide substantially ceases.

3. The process according to claim 2 wherein a predetermined molar excess of carbon is present in the reaction mixture and hyperstoichiometric UC of controlled carbon content is recovered as reaction product.

4. The process according to claim 2 wheerin a predetermined molar deficiency of carbon is present in the reaction mixture and hypostoichiometric UC of controlled carbon content is recovered as reaction product.

5. The process for preparing UC of controlled carbon content from $U_3O_8$ by carbothermic reduction which comprises intimately mixing $U_3O_8$ of −200 mesh particle size with graphite of −200 mesh particle size in a molar ratio of approximately 1:10 in the presence of an organic binder to form homogeneous agglomerates, heating the agglomerates at a first temperature between 800° C and 900° C. until gas evolution consisting principally of carbon dioxide substantially ceases, and then maintaining the reaction mixture at a temperature between 1250° C. and 2000° C. until further gas evolution consisting principally of carbon monoxide substantially ceases.

6. The process of claim 5 wherein the organic binder is polyvinyl alcohol in approximately 1% by weight of $U_3O_8$ present.

7. In a process for reclaiming and reprocessing spent UC fuel elements wherein the UC is first oxidized to $U_3O_8$, in combination therewith the steps of heating the formed $U_3O_8$ with carbon in a molar ratio of approximately 1:10 at a first temperature between 800° C. and 900° C. until gas evolution consisting principally of carbon dioxide substantially ceases, and then maintaining the reaction mixture at a second temperature between 1250° C and 2000° C. until further gas evolution consisting principally of carbon monoxide substantially ceases.

References Cited by the Examiner

UNITED STATES PATENTS 3,250,588    5/1966    Kasberg _____ 23—349

CARL D. QUARFORTH, *Primary Examiner.*

I. DEWAYNE RUTLEDGE, *Examiner.*

S. TRAUB, *Assistant Examiner.*